United States Patent [19]

Klinger

[11] 4,130,844

[45] Dec. 19, 1978

[54] METHOD AND MEANS FOR TRACKING MAGNETIC TRACKS

[75] Inventor: Lance T. Klinger, Playa Del Rey, Calif.

[73] Assignee: Xerox Corporation, Stamford, Conn.

[21] Appl. No.: 735,852

[22] Filed: Oct. 26, 1976

[51] Int. Cl.² .................. G11B 21/10; G11B 5/58
[52] U.S. Cl. ............................................. 360/77
[58] Field of Search ............. 360/77, 78, 75, 86, 360/97–99; 318/467, 468, 638, 639, 647, 653, 561, 626

[56] References Cited

U.S. PATENT DOCUMENTS

| | | | |
|---|---|---|---|
| 3,145,331 | 8/1964 | Romuari | 318/626 |
| 3,250,903 | 5/1966 | Vasu et al. | 318/561 |
| 3,412,300 | 11/1968 | Westenskow | 318/561 |
| 3,534,344 | 10/1970 | Santana | 360/77 |
| 3,593,333 | 7/1971 | Oswald | 360/77 |
| 3,838,457 | 9/1974 | Palmer | 360/78 |
| 3,893,180 | 7/1975 | Braun et al. | 360/77 |
| 3,905,043 | 9/1975 | Frank | 360/77 |
| 4,014,040 | 3/1977 | Kornhass | 360/77 |

Primary Examiner—Alfred H. Eddleman
Attorney, Agent, or Firm—Barry Paul Smith

[57] ABSTRACT

In a tracking system using an error signal derived from recorded dipulses of opposing polarity on each side of the center of a data track recorded on a magnetic medium, the need for highly accurate signal integration is avoided by partially integrating the dipulse signal, and then integrating the partially integrated signal above a predetermined threshold. The resulting double-integrated signal provides an error signal substantially unaffected by DC and noise offsets. A double-ended average pulse detector with feedback using a double-ended "current mirror" to carry out the described method is disclosed.

12 Claims, 8 Drawing Figures

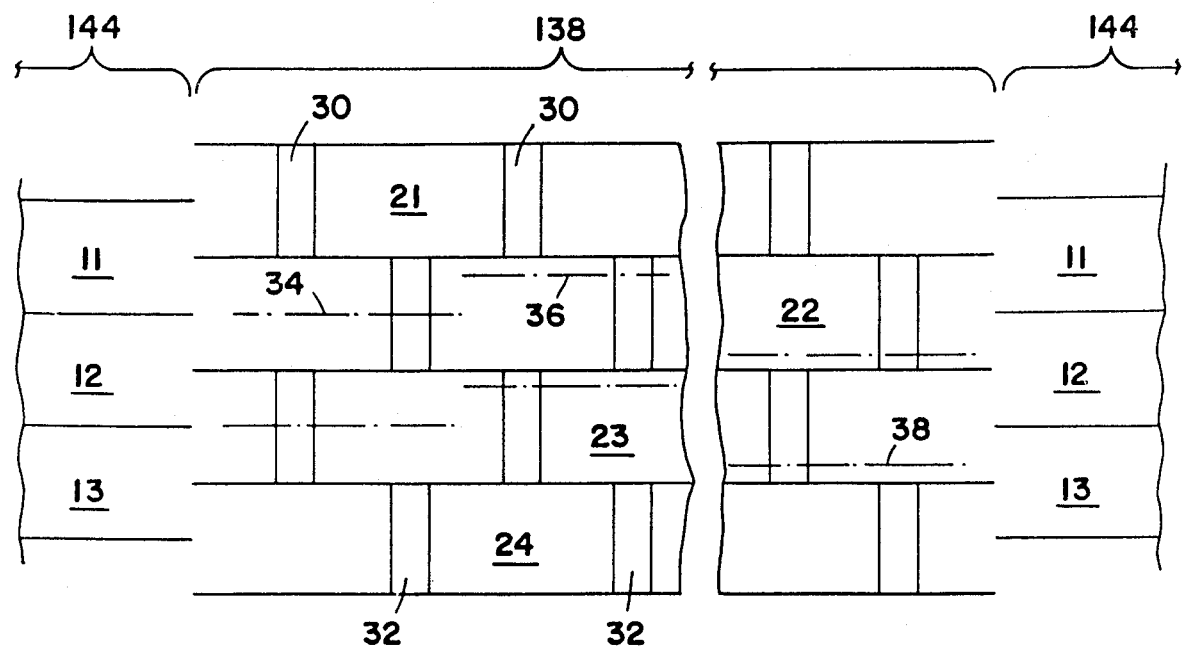
FIG_1
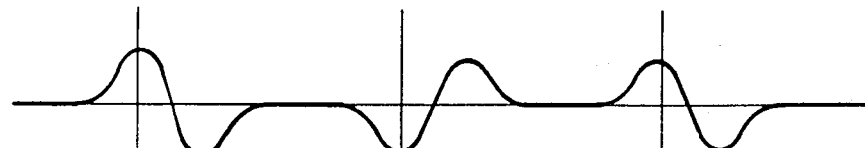
FIG_3a
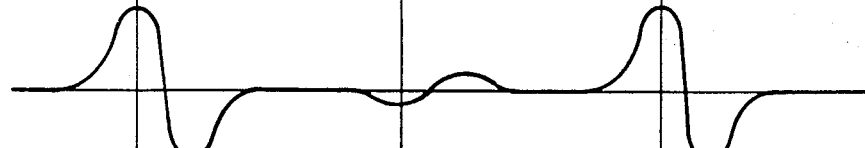
FIG_3b
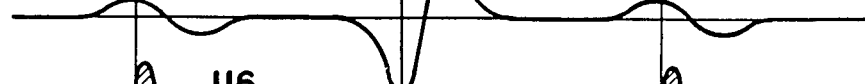
FIG_3c
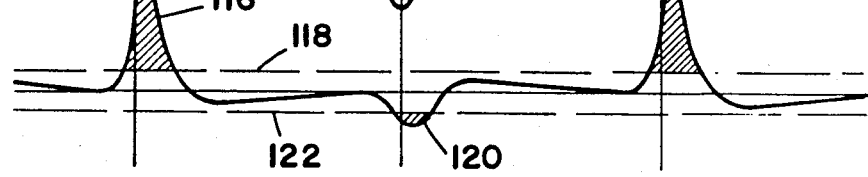
FIG_3d
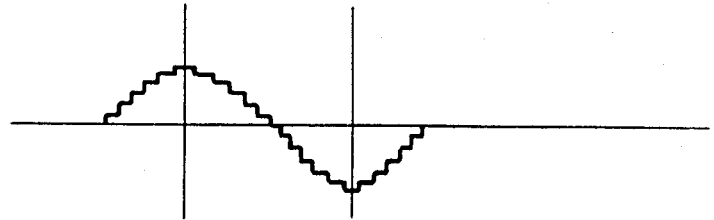
FIG_3e

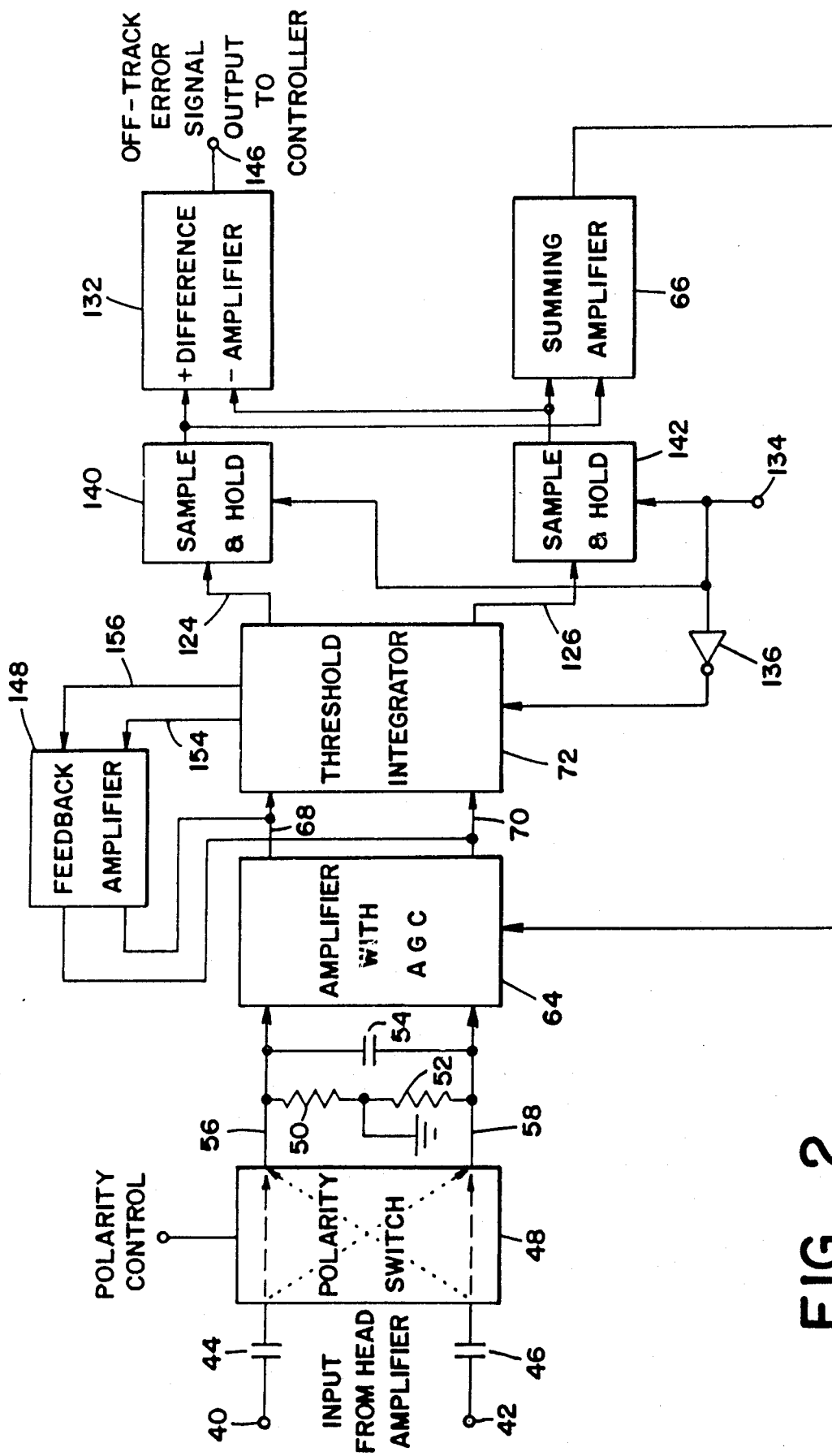
FIG_2

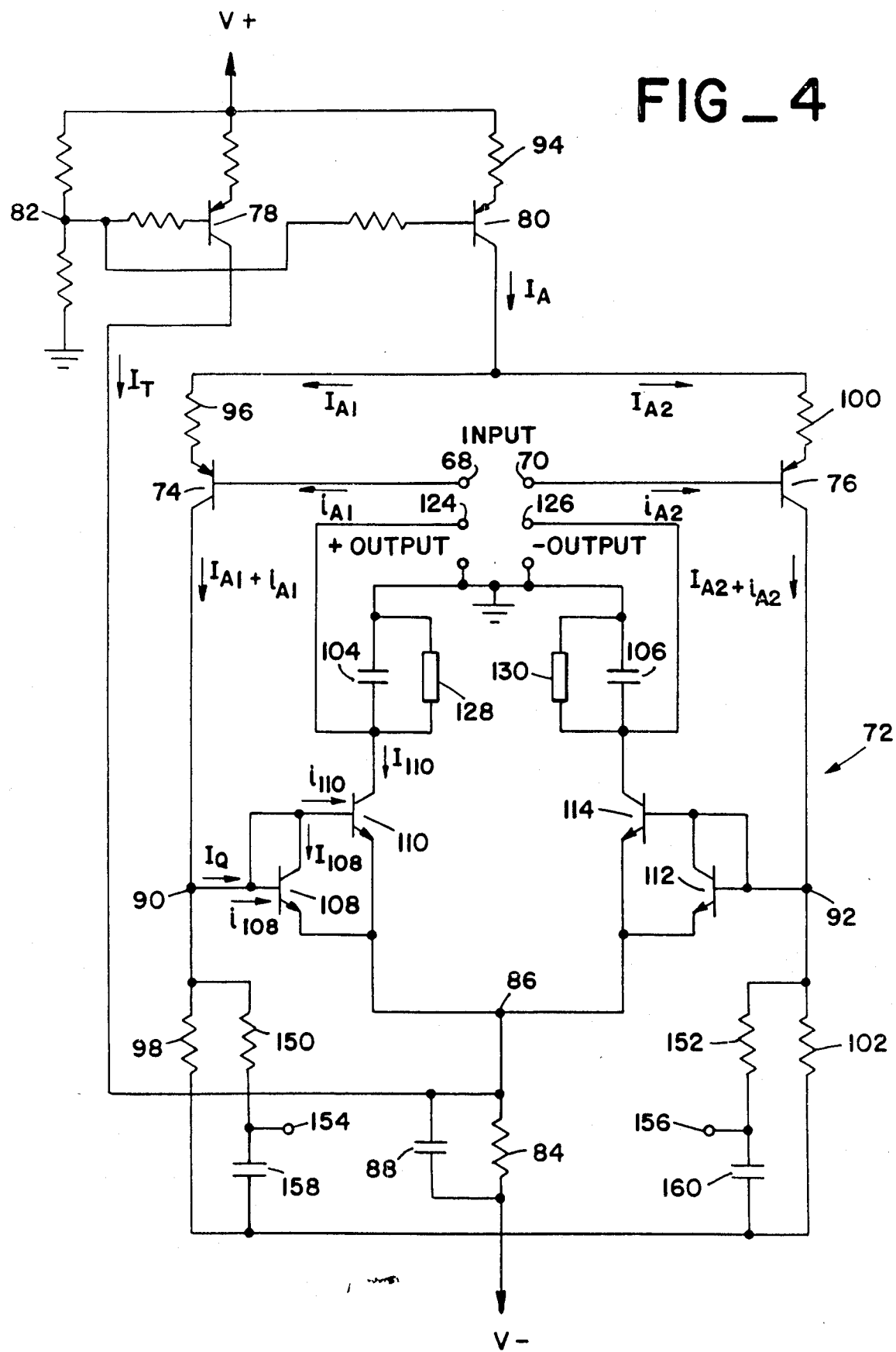
FIG_4

METHOD AND MEANS FOR TRACKING MAGNETIC TRACKS

BACKGROUND OF THE INVENTION

U.S. Pat. No. 3,534,344 discloses an error detection system for use in aligning a head assembly with the data tracks of a disc drive. Basically, in accordance with that patent, alternating odd and even positioning tracks are recorded on the disc, the head assembly being properly aligned with a data track whenever it is positioned precisely mid-way between an odd and an even positioning track. Dipulses of one polarity on the odd tracks alternate in time with dipulses of the opposite polarity on the even tracks. As the position-sensing head straddles a pair of positioning tracks, the oppositely directed dipulses are integrated and compared or processed to produce a null when the amplitude of the even-track dipulses is equal to that of the odd-track dipulses, i.e. when the position-sensing head is precisely centered between an odd and an even track.

The problem with the approach of U.S. Pat. No. 3,534,344 is that it requires rather expensive electronics for precise integration and prevention of ramp formation by DC or offsets, which would adversely affect the accuracy of the tracking error signal. The patent's approach therefore does not readily lend itself to use in low-cost, mass-produced equipment.

SUMMARY OF THE INVENTION

The present invention allows the odd-even dipulse tracking system shown in U.S. Pat. No. 3,534,344 to be adapted to low-cost applications by providing a novel detection circuit and signal processing method which is not significantly affected by DC or offsets, and which is relatively simple in design and construction.

Essentially, the present invention uses an inexpensive short-term integrator (i.e., an integrator with a sufficiently short recovery time to prevent ramp formation) to partially integrate the position dipulses. The circuit then integrates the partially integrated signal a second time, but this time only above a predetermined threshold. In this manner, the effect of any DC or offsets remaining in the circuit is limited to a small fraction of the dipulse-to-dipulse cycle time, making its stringent elimination much less critical. By the same token, the second integration (as opposed to the mere peak detection of an integrated signal) greatly reduces the circuit's sensitivity to noise.

The second integration function is carried out, according to the invention, by a novel double-ended average pulse detector circuit with feedback and threshold. This circuit avoids the high-frequency asymmetry which results from double-ended to single-ended signal conversion. It also eliminates the need for a transformer to eliminate steady-state offsets.

It is therefore the object of the invention to provide a simple but accurate dipulse-type tracking error detection circuit for disc drives.

It is another object of the invention to provide a circuit of the type described which is substantially immune to DC and offsets.

It is further an object of the invention to provide an accurate, offset-immune method of detecting tracking errors with the help of dipulse-type positioning indicia, using a short-term partial integration process followed by a second integration of only those portions of the partially integrated signal which exceed a predetermined threshold.

It is yet another object of the invention to provide a double-ended average pulse detector circuit with feedback which is a preferred means for carrying out the above-threshold integration function of the method of this invention.

BRIEF DESCRIPTION OF THE DRAWINGS

FIG. 1 is a schematic representation illustrating the odd-even arragement of the positioning tracks in respect to data tracks and their dipulse-producing magnetic indicia which constitute the environment in which this invention operates;

FIG. 2 is a circuit diagram, partly in block form, showing a preferred form of apparatus for carrying out the invention;

FIGS. 3a through 3e are time-amplitude diagrams showing the signal waveforms at various places and under various conditions in the apparatus of FIG. 2; and FIG. 4 is a detailed circuit diagram of the double-ended average pulse detector of this invention.

DESCRIPTION OF THE PREFERRED EMBODIMENT

FIG. 1 shows a track arrangement on a magnetic disc suitable for use with this invention. For convenience, the tracks have been shown in FIG. 1 as straight bands, although on a magnetic disc, they are in fact curved around the center of the disc. Likewise, the head motion is described herein as up and down (in FIG. 1), although in reality, the head moves laterally, i.e. radially inwardly and outwardly with respect to the disc. At appropriate intervals along the data tracks (e.g. each 1/48 revolution), short sectors of positioning tracks 21, 22, 23, 24 are recorded to actuate the tracking error detection apparatus of this invention. (Alternatively, complete positioning tracks may be recorded on the back side of the disc.) A series of parallel data tracks 11, 12, 13 can then be recorded on the disc using the position tracks on the disc. The positioning tracks 21, 22, 23, 24 are displaced by one-half of the track spacing from the data tracks 11, 12, 13 so that a head is aligned with the center of a data track whenever it is precisely mid-way between two adjacent positioning tracks.

Each odd-numbered positioning track is positively magnetized except for short areas 30 of negative magnetization. Each even-numbered positioning track is negatively magnetized except for short bits 32 of positive magnetization. The areas 30 are displaced longitudinally from the bits 32 by about one-half of a dipulse separation. As the positioning tracks 22,23 pass under the head of the disc drive in the centered position 34, the output signal produced by the head has the shape shown in FIG. 3a. If the head is too high in FIG. 1 (position 36), the signal has the shape of FIG. 3b; if it is too low in FIG. 1 (position 38), the signal has the shape of FIG. 3c.

For the purposes of the following discussion, be it assumed that the head is too low in FIG. 1 (position 38), and that it is desired to produce an error signal suitable for operating an appropriate conventional electromechanical head positioning device or servo (not shown) in such a way as to correct that misalignment. Be it further assumed in that respect that a positive error signal results in moving the head upwardly in FIG. 1, a negative error signal in moving the head downwardly in FIG. 1.

In the position 38 of the head, a larger portion of the head overlies track 23 than overlies track 22. Consequently, the magnetic reversals 30 produce a larger signal in the head than do reversals 32, as shown in FIG. 3c. The signal of FIG. 3c is applied, after amplification in a double-ended amplifier (not shown), to the input terminals 40, 42 of the circuit of FIG. 2.

The greatest part of any DC offset existing at the inputs 40, 42 is eliminated by coupling capacitors 44, 46 which effectively provide DC isolation of the input circuitry from the signal-processing circuitry shown in FIG. 2. The input signal is next passed through a polarity switch 48 which either passes the signal straight through (dashed lines) or inverts it (dotted lines), depending on whether the head is attempting to track an even data track or an odd data track (in the former instance, a predominantly positive input signal means that the head is too low in FIG. 1, in the latter that it is too high in FIG. 1).

The appropriately polarized input signal is now applied to a partial integrator consisting of resistors 50, 52 and capacitor 54. The components 50, 52, 54 are so chosen that the recovery time of the partial integrator is less than the interval between successive dipulses, so that the signal appearing on lines 56, 58 is only partially integrated. The resulting partially integrated signal appearing on lines 60, 62 is shown in FIG. 3d.

The partially integrated input signal is next applied to a gain-controlled differential amplifier 64 whose gain control input is produced by summing amplifier 66 whose operation will be discussed subsequently herein. The amplified signal appears on lines 68, 70 and is now ready for a second integration, which is performed by the threshold integrator 72.

The threshold integrator 72 of this invention is shown in detail in FIG. 4. The double-ended signal on lines 68, 70 is applied to the bases of transistors 74, 76. The emitter-collector circuits of these transistors are supplied from a pair of current source transistors 78, 80 driven from a common point 82 so as to cancel the effect of any voltage variation in the supply voltage V+.

The emitter-collector current $I_T$ of transistor 78 flows through threshold resistor 84 which is chosen so as to produce a predetermined voltage $V_T$ at point 86. At the operating frequencies of the circuit, resistor 84 is AC-bypassed by capacitor 88.

The emitter-collector current $I_A$ of transistor 80 represents the gain of the circuit 72. It is split into two branches $I_{A1}$ and $I_{A2}$ to produce at points 90, 92 equal quiescent voltages $V_{A1}$ and $V_{A2}$ when no signal is applied at inputs 68, 70. Transistors 74, 76 operate in the linear range so that with no signal at inputs 68, 70, equal base currents $i_{A1}, i_{A2}$ are added to $I_{A1}$ and $I_{A2}$, respectively. The quiescent voltages $V_{A1}$ and $V_{A2}$ are determined by resistors 94, 96, 98 and 94, 100, 102, respectively, and are chosen to be lower than $V_T$ by an amount approximately equal to the desired integration threshold.

In the quiescent state of the circuit 72, no charge is applied to storage capacitors 104, 106 because transistors 108, 110 and 122, 114 are reverse-biased and do not conduct. When a signal is applied to inputs 68, 70 (e.g. a rising potential at input 68 coupled with a falling potential at 70), capacitor 106 remains uncharged because $V_{A2}$ at point 92 drops even further below $V_T$, and transistors 108, 110 begin to conduct.

Transistors 108, 110 are a matched pair, i.e. monolithic transistors on a single substrate; consequently, they have identical characteristics. Therefore, inasmuch as their bases are tied together, $i_{110}$ must equal $i_{108}$, and by the same token $I_{110}$ must equal $I_{108}$, as both transistors have the same gain $\alpha$. The total current $I_Q$ drawn by the transistors 108, 110 from point 90 is $i_{108} + i_{110} + I_{108}$. Inasmuch as $i_{108} = (I_{108}/\alpha)$, $i_{110} = i_{108}$, and $I_{108} = I_{110}$, $I_Q = I_{110}(1 + 2/\alpha)$.

With $\alpha$ being rather large, the factor $(1 + (2/\alpha))$ is essentially unity for practical purposes, and consequently, $$I_{110} \approx I_Q$$

it will be seen that the combination of transistors 108 and 110 forms a current mirror in which changes in $I_Q$ are reflected by like changes in $I_{110}$. Coming back now to the current flow at point 90, it will be seen that in order to raise $V_{A1}$ to the level where transistors 108, 110 start conducting, a current of $I_{A1}$ plus the threshold amount of $i_{A1}$ must flow through resistor 98. Any further increase in $i_{A1}$ is diverted through transistors 108, 110 at $I_Q$. Consequently, $I_Q$ (and therefore also $I_{110}$) is proportional to the amount by which the positive signal on lines 68, 70 exceeds the predetermined threshold.

Over a period of one cycle of the signal on lines 68, 70, the charge accumulated on capacitor 104 is proportional to the shaded area of positive pulse 116 of FIG. 3d, i.e. the integral with respect to time of that portion of the pulse 116 which lies above the positive threshold 118. By the same token, the charge on capacitor 106 is proportional to the shaded area of negative pulse 120 lying below the negative threshold 122. The charges on storage capacitors 104, 106 constitute the positive and negative single-ended outputs, respectively, of the circuit 72 which appear on lines 124, 126.

The nature of elements 128, 130 depends on whether the positioning tracks 21, 22, 23, 24 (FIG. 1) are sectored, as shown in FIG. 1, or continuous (as they might be in double-sided discs on which the data tracks are on one side and the positioning tracks on the other). In the latter case, elements 128, 130 are simply bleeding resistors. In that case, the outputs on lines 124, 126 are continuous, and are fed directly into the difference amplifier 132 and the summing amplifier 66 (FIG. 2).

In the former case, which is the one shown in the drawings, elements 128, 130 are electronic switches controlled by the sampling clock 134 (FIG. 2) through an inverter 136. While the head is in a positioning sector 138 (FIG. 1) of the disc, the switches 128, 130 are open, and the outputs on lines 124, 126 are sampled by sample-and-hold circuits 140, 142 interposed in lines 124, 126 respectively. When the head enters a data sector 144, the sampling clock 134 closes switches 128, 130 through inverter 136 and discharges capacitors 104, 106. At the same time, the sampling clock 134 causes the sample-and-hold circuits 140, 142 to hold the sampled value of the output signal of circuit 72 until the head reaches the next positioning sector 138. As a result, the error signal output 146 of the device of this invention produced by the head moving up or down in FIG. 1 across several tracks as the disc rotates rapidly underneath it takes on the stairstep shape of FIG. 3e.

Several means are preferably provided to make the device of this invention immune to low-frequency offsets and supply-voltage and temperature variations. In addition to the common-point drive of transistors 78 and 80 discussed above, a low-frequency feedback signal may be provided to feedback amplifier 148 (FIG. 2)

through resistors 150, 152 (FIG. 4) and lines 154, 156. At signal frequencies, the feedback circuit is disabled through bypass capacitors 158, 160. This feedback loop keeps $V_{A1}$ equal to $V_{A2}$ at low frequencies and thus avoids any output distortion resulting from write recovery or similar low-frequency disturbances or DC asymmetries. Also, capacitors 44 and 46 act, together with the input drive circuit output impedance, to reject low frequency disturbances.

The overall gain of the device can be stabilized by controlling the gain of AGC amplifier 64 by a signal representing the sum of the outputs 124, 126 of circuit 72. Inasmuch as an increase in output 124 entails a corresponding decrease in output 126 and vice versa, the sum of these two outputs should remain substantially constant throughout the range of the device.

Immunity to noise and to those offsets which still remain in the circuitry of this device is provided by the novel method of operation of the device of this invention. In the partial integration stage formed by resistance-capacitance network 50, 52, 54 (FIG. 2), the recovery time of the network is on the order of one dipulse interval. By contrast, prior art systems required integration throughout the whole sample period. Consequently, the formation of ramps as a result of the cumulative effect of small offsets is avoided by the present invention.

In the second integration stage of circuit 72, where integration does proceed through a substantial number of dipulses, the effect of any offset is minimized by the fact that the integrator operates only while the signal is above the threshold value, i.e. only during a relatively small part of the dipulse interval, as opposed to ideal integration of an offset throughout the sample time. Noise immunity is provided by the fact that the output signals on lines 124, 126 are derived from an integration of the above-threshold portions of the signal rather than from a mere peak detection.

Finally, high-frequency asymmetry resulting from double-ended to single-ended conversion is avoided by carrying the double-ended character of the signal all the way from the input 40, 42 to the second integrator 72.

The accumulated signal on capacitors 104 and 106 at the end of the sample time is sampled at outputs 124, 126 and held by sample-and-hold circuits 140 and 142 until the next sample period. The sampled outputs 124 and 126 are subtracted in difference amplifier 132 to produce the off track error signal at output 146, and added in summing amplifier 66 to produce the control signal for the automatic gain control (AGC) amplifier 64.

What is claimed is:

1. In a magnetic media tracking system of the type using dipulses of alternating polarity to produce an error indication through integration, the improvement comprising:
    (a) means for partially integrating said dipulses to form a partially integrated signal;
    (b) means for separately integrating only those positive and negative portions of said partially integrated signal whose absolute value exceeds a predetermined threshold; and
    (c) means for subtractively combining said positive and negative portions to form said error indication.

2. The improvement of claim 1, in which said partial integration means include an integration circuit whose recovery time is shorter than the interval between successive dipulses.

3. The improvement of claim 1, further comprising means for additively combining said positive and negative portions and controlling the gain of said tracking system with said additive combination.

4. The improvement of claim 1, further comprising means for selectively changing the polarity of said error indications.

5. In the method of tracking magnetic tracks on a magnetic medium, which method involves detecting dipulses of alternating polarity associated with said tracks, and integrating and comparing said dipulses to produce an error indication, the improvement comprising the steps of:
    (a) performing an only partial integration of said dipulses;
    (b) performing a second integration of only those portions of said partially integrated dipulses whose amplitude exceeds a predetermined threshold; and
    (c) deriving said error indication from said second integration.

6. The improvement of claim 5, in which said partial integration is a short term integration over a time period smaller than the interval between successive dipulses.

7. The improvement of claim 5, in which said second integration is performed separately on the positive portions and the negative portions of said partially integrated dipulses, and said error indication is derived from a subtractive combination of the results of said separate second integrations.

8. An integrating circuit for integrating an electrical signal only above a predetermined amplitude threshold, comprising:
    (a) current mirror means including a pair of monolithic transistors having their bases connected together and their emitters connected together, the collector of one transistor of said pair being connected to said common base connection;
    (b) means connecting said common emitter connection to a fixed threshold potential;
    (c) current source means connected to said common base connection and arranged to establish, in the absence of said electrical signal, a quiescent voltage lower than said threshold potential at said common base connection;
    (d) means for applying said electrical signal to said current source means;
    (e) capacitive means connected, respectively, between the collector of the second transistor of said pair of transistor and a fixed reference potential; and
    (f) output means connected between said capacitive means and said second transistor's collector;
    whereby the output of said output means is representative of the integral of those portions of said electrical signal whose amplitude exceeds a predetermined threshold.

9. The circuit of claim 8, in which the currents for the production of said threshold potential and said quiescent voltage are derived from a common supply point to cancel out the effects of supply variations.

10. The circuit of claim 8, further comprising electronic switch means connected to periodically discharge said capacitive means.

11. An integrating circuit for separately integrating positive and negative portions of a double-ended electrical signal only above a predetermined amplitude threshold, comprising:

(a) double-ended current mirror means including two pairs of monolithic transistors, each pair having its bases connected together and its emitters connected together, the collector of one transistor of each pair being connected to the common base connection of its pair;

(b) means connecting the common emitter connections of both pairs to a fixed threshold potential;

(c) a pair of current source means connected, respectively, to the common base connection of each of said pairs of transistors, and arranged to establish, in the absence of said electrical signal, an equal quiescent voltage lower than said threshold potential at each of said common base connections;

(d) means for applying the two ends, respectively, of said double-ended electrical signal to said pair of current sources;

(e) a pair of capacitive means connected, respectively, between the collector of the second transistor of each of said pairs of transistors and a fixed reference potential; and (f) a pair of output means connected, respectively, between the collector of the second transistor of each of said pairs of transistors and a fixed reference potential; and (f) a pair of output means connected, respectively, between said capacitive means and said second transistor's collector in each of said pairs of capacitive means and transistors;

whereby the outputs of said output means are representative of the integral of those portions of said electrical signal whose amplitude exceeds a predetermined threshold, one output representing the integral of the positive portions of said electrical signal, and the other representing the negative portions thereof.

12. The circuit of claim 11 in which said electrical signal is high-frequency AC, further comprising AC-bypassed double-ended feedback means connected to said common base connections and arranged to keep the potentials of said common base connections equal at low frequencies without impairing their response at the frequency of said electrical signal.

* * * * *